Feb. 14, 1961 — A. J. FREI — 2,971,346
REFRIGERATION
Filed June 11, 1958 — 2 Sheets-Sheet 1
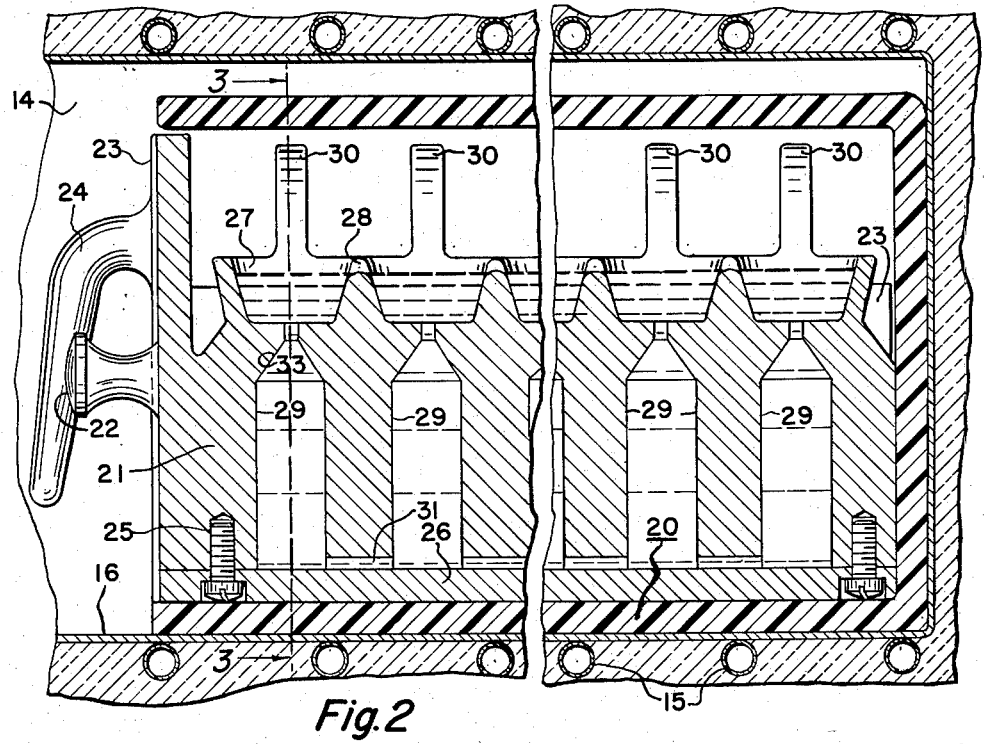
Fig. 2
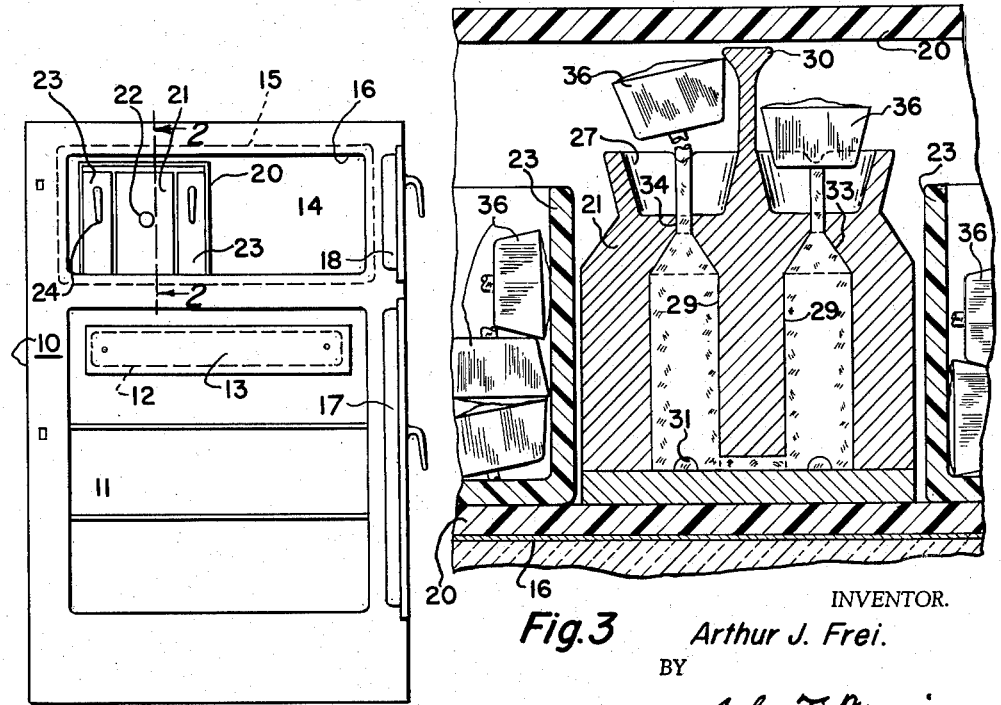
Fig. 1
Fig. 3
INVENTOR.
Arthur J. Frei.
BY John T. Marvin
His Attorney.

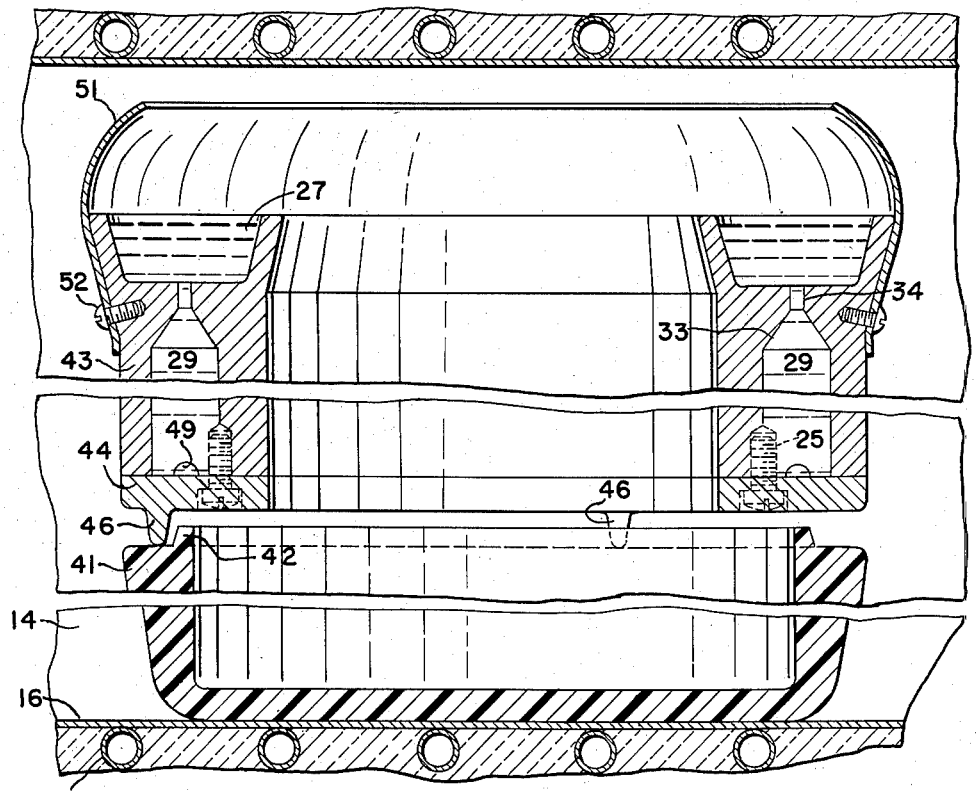
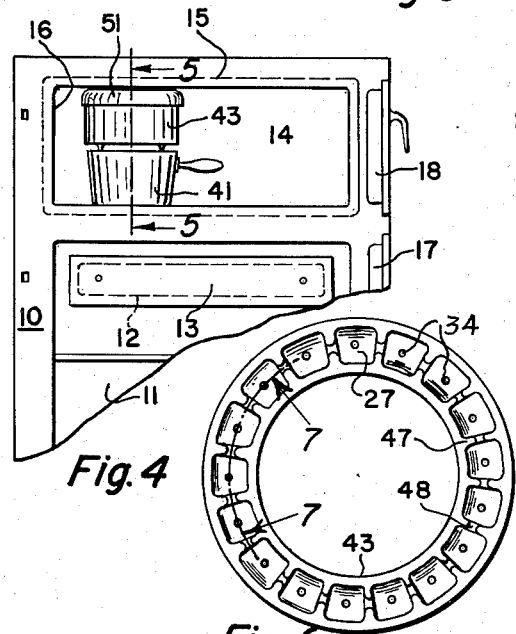
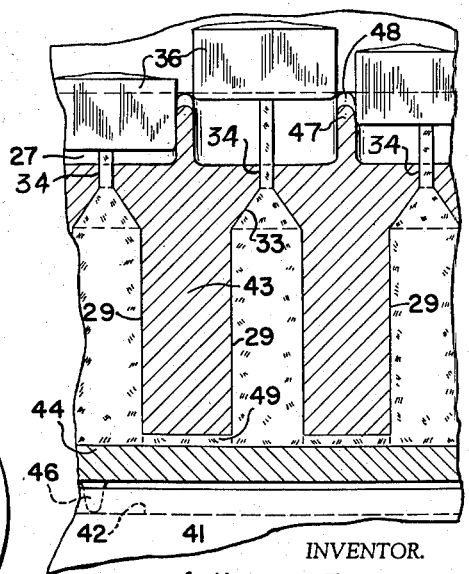
Fig. 5
Fig. 4
Fig. 6
Fig. 7
INVENTOR.
Arthur J. Frei.
BY John T. Marvin
His Attorney.

United States Patent Office 2,971,346
Patented Feb. 14, 1961

2,971,346

REFRIGERATION

Arthur J. Frei, Dayton, Ohio, assignor to General Motors Corporation, Detroit, Mich., a corporation of Delaware Filed June 11, 1958, Ser. No. 741,256

18 Claims. (Cl. 62—71)

This invention relates to refrigeration and particularly to the production of ice blocks in a freezing compartment of a household refrigerator.

An object of my invention is to provide an improved method of and device for freezing water in a household refrigerator cabinet into ice blocks or pieces and of automatically releasing same from the device into an ice storage or harvesting means or receptacle used in conjunction with the refrigerator.

Another object of my invention is to provide in an ice block making apparatus in a refrigerator a hydraulic arrangement for releasing and/or ejecting ice blocks therefrom whereby to eliminate the necessity of incorporating relatively movable manually operated parts in a freezing device thereof.

A further object of my invention is to provide a freezing device comprising a mold having ice forming chambers therein of different volume with respect to one another and operatively communicating one with the other by a restricted passage which chambers are substantially filled with drinking water and the mold placed in the freezing compartment of a refrigerator to automatically, without further manual effort, eject ice pieces in a dry state into a storing and harvesting means removably associated with the freezing device in the refrigerator.

A still further object of my invention is to provide an ice block maker in a refrigerator wherein the release of ice blocks or pieces of ice therefrom is accomplished without application of heat hydraulically and automatically to eliminate the use of conventional trays and grids and mechanisms associated with one or the other thereof requiring a housewife to exert force thereto for mechanically loosening and releasing ice blocks.

A more specific object of my invention is to provide an ice block maker with a freezing device comprising a mold having ice block or ice piece forming chambers or cavities therein and associated communicating substantially liquid confining chambers both of which are filled with a homogeneous body of liquid the entire body of which is freezable at the same temperature, simultaneously chilling the liquid by an evaporator of a refrigerating system, and wherein the liquid in the chambers is differentially frozen or liquid in one of the chambers frozen subsequent to freezing liquid in the other into a solid ice piece which subsequent freezing is utilized to shift the ice pieces out of the mold into a storage means within a refrigerator.

Further objects and advantages of the present invention will be apparent from the following description, reference being had to the accompanying drawings, wherein preferred forms of the present invention are clearly shown.

In the drawings:

Figure 1 is a front view of a multiple compartmented household refrigerator cabinet with doors of the compartments open and showing an ice block making arrangement of the present invention disposed in the cabinet freezing compartment;

Figure 2 is an enlarged broken fragmentary sectional view taken on the line 2—2 of Figure 1 showing a mold of a freezing device filled with water to be frozen;

Figure 3 is a fragmentary sectional view taken on the line 3—3 of Figure 2 showing an ice block shifted away from the mold prior to its discharge into a storing and harvesting receptacle;

Figure 4 is a fragmentary front view of the refrigerator cabinet disclosed in Figure 1 showing a modified form of an ice making arrangement disposed in the freezing compartment thereof;

Figure 5 is an enlarged broken fragmentary sectional view taken on the line 5—5 of Figure 4 more clearly illustrating the modified ice making arrangement;

Figure 6 is a top view of the ice making arrangement disclosed in Figures 4 and 5 with a deflector thereon removed therefrom; and Figure 7 is a fragmentary sectional view taken on the line 7—7 of Figure 6 showing a portion of the freezing device mold of the modified ice making arrangement with ice blocks in the mold.

Referring to the drawings, for illustrating the present invention and the principle incorporated therein, I show in Figure 1 a refrigerating apparatus including an insulating household refrigerator cabinet 10 of the multiple compartment type in which my ice block or ice making arrangement is incorporated. Cabinet 10 is provided with a lower unfrozen food storage compartment 11 which is cooled to a temperature of from, for example, 37° to 45° F. by a plate-like sheet metal evaporator 12 of a refrigerating system associated with the cabinet which evaporator is located behind a protecting cover or baffle 13. Cabinet 10 is also provided with an upper or frozen food storage compartment 14 which is cooled to a temperature well below 32° F. for the storage of frozen foods, for freezing foods and/or for freezing water in freezing devices removably disposed in compartment 14 into ice blocks or ice pieces for table use in chilling salads or the like and drinks in glasses. Compartment 14 is refrigerated to a below water freezing temperature by an evaporator 15, of the refrigerating system associated with cabinet 10, which evaporator is in the form of a conduit coiled or wrapped around the outside of and secured in metal-to-metal contact to a metal can-like member 16 forming the liner of compartment 14 (see Figure 2). Doors 17 and 18 are hingedly mounted on cabinet 10 to provide individual closures for the compartments 11 and 14 respectively as is conventional in the art. A box-like structure, generally indicated at 20, is removably supported upon the bottom wall of liner 16 within compartment 14, at one side thereof, and this structure constitutes a part of one form of my ice block making and releasing device.

The five-sided box structure 20 is non-metallic and its walls are preferably constructed of molded plastic material of any suitable or conventional composition. Box 20 houses an elongated or substantially rectangular-shaped metal mold 21 preferably constructed of aluminum and having a handle or knob 22 formed thereon or secured thereto for handling same in removing it from the box or placing it therein. A molded plastic ice storage means, bucket or receptacle 23 removably disposed on either side of mold 21 are each provided with a handle 24 to facilitate detachably placing same in box 20, within compartment 14, and removal thereof from the compartment. Mold 21 is made in two parts and has its bottom plate 26 secured to the mold body by a plurality of screws or bolts 25 (see Figure 2). The metal mold is supported on the bottom wall of molded plastic box 20 and is insulated thereby from and maintained out of direct metal-to-metal contact or metal conductive relationship with liner 16 and consequently evaporator 15. The bottom wall of box 20 may be made thicker than other walls thereof or it may, if desired, include an auxiliary slab or layer of other suitable insulating material disposed between its inner and outer surfaces for this insulation or isolation purpose. Mold 21 is provided with two rows of circular open ended cup-like chambers or cavities 27 bounded by thin inclined walls thereof. The adjoining or intermediate wall of circular cavities 27 is cut out or recessed as at 28 to form valleys for a purpose to be hereinafter described. A bore beneath or adjacent each chamber or cavity 27 forms an elongated cylindrical substantially liquid confining chamber 29 in the mold operatively communicating with its associated open top cavity. A deflector 30 is mounted on or formed integral with mold 21 and includes opposed outwardly projected lip portions for a purpose to be hereinafter explained. As disclosed chambers 29 are of greater volume than the open top chambers or cavities 27 and this increased chamber volume or water capacity is employed for a purpose to be hereinafter described. The plurality of adjacent chambers 29 in each row are preferably interconnected with one another and with chambers of the other row thereof at their bottoms by cut out passageways 31 in mold 21 so as to facilitate the uniform filling of these chambers and cavities 27 with water. Each chamber 29 is provided with a beveled or inclined wall 33 which gradually tapers toward or merges with a small bore or restricted passage 34 in a partition of the mold opening into its adjacent cavity 27 above a chamber. This provides each chamber 29 with a choke portion having a function in the present disclosure that will become apparent in the following description. Two or more of the molds 21 of the present freezing device are furnished along with the box 20 and the ice storage means or receptacles 23 for use therewith as will be presently described. The freezing device, box 20, mold 21 and receptacle 23, is to be removably contained in each new refrigerator and the characteristics of this device also renders it applicable for disposition in the freezing compartment of existing refrigerators without altering them.

Assume that a housewife or user of a refrigerator cabinet equipped with the presently disclosed ice maker or freezing device desires a ready supply or large quantity of ice blocks in the storage means or receptacles 23 within the refrigerator. The chambers 29 and cavities 27 of mold 21 of the freezing device are either filled with drinking water by a pitcher at the refrigerator, upon sliding the mold outwardly of box 20 and compartment 14, or the mold may be bodily removed from the refrigerator cabinet and held under a supply of tap water and after being substantially filled therewith then repositioned into box 20 in the freezing compartment. As water flows into chambers 29 the level thereof is equalized throughout the various chambers by virtue of water flowing from one to another of the chambers through the interconnecting passageways 31. When the chambers 29 become filled, the water rises in cavities 27 and overflows from one to another by way of recesses or valleys 28 to equalize the level of water in all of the ice block or ice piece forming cavities (see Figure 2). When water filled mold 21 is slid into or repositioned in box 20 the level of water in the cavities 27 should be at or just below the equalizing valleys or recesses 28. The water level can be established by carefully filling the mold or if this level has been exceeded in filling the mold at a sink it can be repeatedly tilted to run water therefrom until the desired level thereof in the mold is attained. Thus mold 21 contains two bodies of water in communication with one another by the restricted body of water in passage 34. Mold 21 being insulated from or supported out of direct contact with liner 16 of freezing compartment 14 is therefore cooled by cold air or the low temperature within this compartment. While I herein rely on the increased volume of water in chambers 29, over the relatively smaller volume of water in cavities 27, to insure differential freezing of the water, or freezing of water and expansion of ice in the chambers 29 subsequent to freezing water in the cavities 27 into solid ice pieces or blocks for shifting the ice pieces outwardly of the cavities and for ejecting the ice pieces from mold 21, it is to be understood that other arrangements can be provided to accomplish this result without departing from the spirit of my invention. For example the volume of water in cavities 27 and chambers 29 could be substantially the same and provisions made for directly and conductively cooling one chamber faster than another to obtain differential freezing of water therein whereby to eject solid ice pieces from the one chamber before water freezes and expands in the other chamber. The entire homogeneous body of water contained in cavities 27, passages 34 and chambers 29 of mold 21 is simultaneously chilled, by the freezing effect produced by evaporator 15 and, due to the small spread out volume of water in cavities 27 together with the thin walls thereof as compared to the larger volume of water in chambers 29, the water in each cavity-like chamber 27 becomes hard-frozen into solid ice pieces or blocks prior to water freezing in the chambers 29. The ice pieces or blocks freeze solidly over the bores or passages 34 and the ice may extend a short distance into these passages without impairing the function thereof in the device. As the temperature of water in chambers 29 continues to be or is further reduced it begins to freeze and expand in volume. The expanding water and ice mass in chambers 29 creates a great force capable of overcoming high resistance as is well-known to those skilled in the art. Choke portion, wall 33, of the liquid confining chambers 29 in mold 21 constricts the expanding mass therein and concentrates it to or at the passages 34. The expanding mass moves or is extruded, in the form of a column of ice, upwardly through passage 34 to push or free an integral ice block or ice piece at the top thereof, indicated at 36 in Figure 3 of the drawings, in toadstool-like fashion from walls of a cavity 27. As the small diameter stem of the toadstool-like ice column increases in length or height it also begins to bow or curve from the vertical and the weight of the ice piece 36 thereon becomes offset with respect to its cavity 27 and the axis of passage 34. The offset or unbalanced weight of the ice piece 36 causes same to fracture away from the stem substantially at its juncture therewith. The column or stem of ice projecting from the frozen mass into a cavity 27 prevents the loosened ice piece 36 from falling back into the now emptied cavity and the ice piece will topple over the side of mold 21 into an ice storage means or receptacle 23 (see Figure 3). If desired, the cavities 27 and chambers 29 may be inclined from the vertical toward the open top of receptacles 23 to insure that when the ice pieces 36 break away from the stem or extruded column of the frozen mass, projecting from chambers 29 into cavities 27, the loosened ice pieces will be directed toward and into the storage receptacles. Frequently and in the ordinary use of the refrigerator 10 opening and/or closing of a door 17 or 18 thereof will jar the cabinet sufficiently, after the ice stem has attained its approximate maximum height, to cause an ice piece 36 to break away from the frozen expanding column or stem of ice. However in order to prevent any malfunctions of the freezing device and to insure ejection of ice pieces from mold 21 into the receptacles 23 I deem it desirable to provide the deflector 30 hereinbefore mentioned. With the use of deflector 30 in cooperation with mold 21 the elevated ice pieces 36 come into contact with one of its outwardly projected lips and thereupon an ice piece is fractured from the frozen stem and is flipped or directed laterally of the mold into a storage means or receptacle 23. The ice pieces 36 may or may not be simultaneously freed from the cavities 27 and ejected from mold 21 but this is of no concern since substantially all the water in the mold is congealed or frozen by the time any one of the ice pieces or blocks breaks away from walls of its cavity. In other words the ice pieces 36 may be ejected at random from the mold and directed into a storage receptacle together with one another and/or one after the other.

Should the housewife desire more ice pieces or blocks to be supplied to the ice storage means or receptacles 23 the mold 21, from which ice pieces have been ejected, together with the frozen mass remaining therein is slid outwardly of box 20 and removed from compartment 14 of refrigerator 10 and placed upside-down in the kitchen sink. The mold 21 is of light weight and can be manually moved or transported with ease. The additional or extra mold furnished with the freezing device or arrangement herein disclosed is now put to use. The extra mold is filled with drinking water, as previously described with regard to mold 21, and inserted into box 20 within compartment 14. The same course of events take place as outlined with respect to the previously chilled mold and ice pieces are ejected from this additional or extra mold. Alternate use of the molds may be repeated as desired until a sufficient supply of ice pieces 36 have been accumulated or collected in the receptacles 23. It being understood that ice will be thawed or defrosted from the mold placed in the sink by room temperature and water will have been completely drained out of the inverted mold prior to a subsequent use thereof. This insures the user that ice pieces will be formed of fresh drinking water and in this manner the chambers of the molds are kept free of impurities or mineral deposits therein.

Referring now to Figures 4 to 7 of the drawings I show a modified freezing device or arrangement having the principle of my invention embodied therein. In this modified showing the ice piece freezing device or arrangement includes a circular molded plastic or suitably insulated ice storage means or receptacle 41 which may be of any desirable construction and is removably supported on the bottom wall of liner 16 of compartment 14 of the refrigerator cabinet 10 (see Figure 4). This means or receptacle 41 is provided with a top rim which is shouldered as at 42 (see Figure 5) to provide a support for the freezing device proper. The freezing device proper comprises a hollow cylindrical mold 43 the bottom plate 44 of which, suitably secured thereto, is provided with three or four short integral projections 46 forming supporting feet for detachably centering and mounting the mold on the receptacle 41 by their engagement with the flange adjacent shoulder 42. The top surface of the wall of hollow mold 43 has a row or a plurality of chambers, cups or cavities 27 provided therein therearound. These cavities 27 are oblong in planular shape (see Figure 7) and are separated or spaced apart by thin walls 47 having a cut out recessed or valley part 48 thereof permitting communication of water therebetween above a predetermined level (see Figures 6 and 7). The bores which provide the enlarged cylindrical chambers 29 in mold 43, one below each of the cavities 27, are in communication with one another by cut out passageways 49 (see Figures 5 and 7). Chambers 29 in mold 43 are also provided with a tapered choke portion, wall 33, and a restricted passage 34 establishes communication between the cavities 27 and chambers 29 therebelow as in mold 21 previously described. Collarlike deflector 51 may be formed integral with mold 43 and is preferably a separate sheet metal member fastened thereto by screws or the like 52 (see Figure 5). In this modification the ice storage means or receptacle 41 insulates the freezing device mold 43 from and maintains it out of direct contact with liner 16 and consequently evaporator 15. As is the case with respect to the freezing device disclosed in Figures 1-3 two or more of the molds 43 are furnished with a receptacle 41 in order to permit complete thawing or defrosting of one mold while the other is being employed in compartment 14 of cabinet 10 for producing ice blocks or ice pieces. As described in conjunction with the device shown in Figures 1-3 of the drawings it is possible to omit the deflector 51 by positioning the aligned cavities 27 and chambers 29 of mold 43 at an inclination relative to the vertical and toward the hollow or central opening in the mold but use of the deflector 51 is preferred. In this modification the ice pieces 36 are freed from walls of cavities 27 of mold 43, elevated and broken away from the extruded stem or column of the frozen expanding mass in the mold whereupon the loosened ice pieces topple, or are flipped and directed, by deflector 51, toward the center of the freezing device and they pass or are discharged through the central opening of hollow mold 43 into the storage means or receptacle 41. If it is desired to dispense ice pieces received in receptacle 41 therefrom at a serving table remote from the refrigerator cabinet 10, mold 43 is detached from the receptacle and placed upside-down in a sink and receptacle 41 is then carried or transported to the ice block serving point. The shouldered flange on receptacle 41 serves a two-fold purpose in that in addition to centering and supporting mold 43 thereon it provides a mounting for a cover or closure member, furnished with this modified ice making arrangement, to be placed on the receptacle while transporting same and during a tea or cocktail party in the vicinity of the serving table remote from the refrigerator.

Having described my invention it should be apparent that I have provided a new method of and device for making and automatically harvesting ice blocks or pieces of ice in a mold within a household refrigerator cabinet. By my invention I eliminate the use of manually operated movable members in an ice making device for releasing ice pieces therefrom. My improved arrangement is of low manufacturing cost and is one that can be retailed to the public for use in new or existing refrigerators at a price commensurate with what people are willing to or capable of paying for features of a semi-automatic ice block maker. The improvement herein disclosed eliminates the use of conventional ice tray and grid structures which require a housewife to exert considerable force thereto during an ice block harvesting operation. The important or essential principle involved in the present disclosure is that of differentially freezing a homogeneous body of liquid or communicating homogeneous bodies of water normally capable of freezing at the same temperature in portions of a mold, as distinguished from chilling a heterogeneous body of liquid or a liquid body of separable ingredients which freeze at different temperatures when simultaneously cooled and from chilling non-communicating dissimilar bodies of liquid, for expanding the subsequently freezing mass in one chamber through the restricted passage into the other chamber or cavity to obtain a substantially ice-operated motor effect. In this manner my device is made devoid of flexible seals or movable diaphragms which can become cracked or broken and thus render the device inoperative. While a difference in volume and subsequent freezing of water in the larger chamber is herein disclosed to accomplish the desired result it is within the realm of my invention, as hereinbefore mentioned, to cool one chamber of two similar volumed communicating chambers of a mold faster than the other chamber therein by various arrangements or structures to obtain the stated differential freezing of the homogeneous liquid in the chambers.

While the forms of embodiment of the invention as herein disclosed constitute preferred forms, it is to be understood that other forms might be adopted, as may come within the scope of the claims which follow.

What is claimed is as follows:

1. In combination, a compartment, a freezing device having an ice storage means associated therewith in said compartment, said freezing device comprising a mold having a plurality of separate spaced apart cavities in the top thereof and a substantially liquid confining chamber below each of said cavities interconnected with one another, said chambers being of greater volume than the cavities and each having a choke portion provided with a restricted passage opening into a cavity thereabove, said chambers and said cavities of the mold containing water to be frozen respectively therein, a refrigerating system including an evaporator for cooling air in said compartment to a temperature below 32° F., said mold being out of thermal conductive relationship with said evaporator to cause simultaneous chilling of the cavities and chambers therein within said compartment whereby the water in said chambers is frozen subsequent to the freezing of water in said cavities into ice pieces, said choke portion of said chambers constricting expansion of freezing water and ice therein, and said ice pieces being shiftable outwardly of said cavities solely in response to the mass in said chambers expanding into and through said restricted passages for discharge thereof into said storage means.

2. The combination defined by claim 1 wherein a deflector is engageable by the ice pieces during shifting thereof relative to the mold to break them loose from the expanding mass and for directing the loosened ice pieces into said storage means.

3. In combination, a compartment, a refrigerating system including an evaporator for cooling air in said compartment to a temperature below 32° F., a freezing device within said compartment comprising a mold having a cavity therein and a substantially liquid confining chamber adjacent thereto, means for insulating said mold from said evaporator whereby the cavity and chamber therein are simultaneously chilled in said compartment, said chamber being of greater volume than said cavity and having a choke portion communicating therewith, said chamber and said cavity of the mold containing water to be frozen respectively therein, said insulating means including a receptacle associated with said mold and adapted to receive ice therefrom, said receptacle being detachable from the mold and removable from said compartment, the water in said chamber being frozen subsequent to freezing water in said cavity into an ice piece, said choke portion of said chamber constricting expansion of freezing water and ice therein, and said ice piece being shiftable outwardly of said cavity solely in response to the expanding mass in said chamber for discharge thereof into said receptacle.

4. The combination defined by claim 3 wherein a deflector is engageable by the ice piece during shifting thereof relative to the mold to break it loose from the expanding mass therein and for directing the loosened ice piece into the receptacle.

5. In combination, a compartment, a refrigerating system including an evaporator for cooling the interior of said compartment to a temperature below 32° F., a freezing device within said compartment comprising a mold having a cavity therein and a substantially liquid confining chamber adjacent thereto, said device being detachably mounted on a receptacle removably supported in said compartment, said receptacle insulating said mold from said evaporator and being adapted to receive ice from said mold, said chamber having a choke portion operatively communicating with said cavity, said chamber and said cavity containing water to be frozen therein, the insulating of said mold from said evaporator providing for the simultaneous chilling of the cavity and chamber thereof and causing water in said cavity to freeze into an ice piece therein prior to freezing water in said chamber, said choke portion of said chamber constricting expansion of freezing water and ice therein, and said ice piece being shiftable outwardly of said cavity solely in response to the expanding mass in said chamber for discharge thereof from said mold into said receptacle.

6. The combination defined by claim 5 wherein a deflector on the mold is engageable by the ice piece during shifting thereof to break it loose from the expanding mass and for directing the loosened ice piece into the removable receptacle.

7. In combination, a compartment, a refrigerating system including an evaporator for cooling air in said compartment to a temperature below 32° F., a freezing device within said compartment and removable therefrom, said freezing device comprising a hollow cylindrical mold having a plurality of separate spaced apart cavities in the top of a wall thereof and a substantially liquid confining chamber below each of said cavities, said chambers being of greater volume than the cavities and each having a choke portion provided with a restricted passage opening into a cavity thereabove, said device being detachably mounted on a receptacle removably supported in said compartment, said receptacle supporting said device out of direct contact with said evaporator, said cavities and said chambers containing water to be respectively frozen therein, said cavities and said chambers being simultaneously chilled by said evaporator within said compartment whereby the water in said chambers is frozen subsequent to the freezing of water in said cavities into ice pieces, said choke portion of said chambers constricting expansion of freezing water and ice therein, and said ice pieces being shiftable upwardly of said cavities solely in response to the mass in said chambers expanding into and through said restricted passages for discharging them through the hollow mold into said receptacle.

8. The combination defined by claim 7 wherein deflector means on the mold is engageable by the ice pieces during shifting thereof relative to their cavities to break them loose from the expanding mass and for directing the loosened ice pieces centrally of the device through the hollow mold into the receptacle.

9. An ice maker comprising in combination, a compartment enclosing a mold, said mold having a first open top chamber in one portion thereof, a second chamber in another portion thereof and a restrictor passage providing communication between said chambers, said passage and said chambers being adapted to receive and retain water therein, means for simultaneously cooling both portions of said mold within said compartment, the water in said open top chamber being in direct contact with cold air in said compartment, means for causing differential freezing of water contained in the chambers to form a solid block of ice in said first open top chamber and to subsequently expand the freezing mass in said second chamber therefrom through said restrictor passage into said first open top chamber, and said expanding mass serving as the sole means to shift the whole ice block frozen in said open top chamber outwardly thereof to expose substantially all surfaces of the block of ice to cool air within said compartment and ready the ice block for removal from the mold.

10. An ice maker comprising in combination, a compartment enclosing a mold, said mold having a first chamber in one portion thereof, a second chamber in another portion thereof and a restrictor passage providing communication between said chambers, said passage and said chambers being adapted to receive and retain water therein, a refrigerating system associated with said ice maker including a refrigerant evaporator for simultaneously cooling both portions of said mold within said compartment, the water in said first chamber being in direct contact with cooled air in said compartment, means in said compartment insulating said mold from said evaporator for differentially freezing water contained in the chambers to form a solid block of ice in said first chamber and subsequently expand the freezing mass in said second chamber therefrom through said restrictor passage into said first chamber, and said expanding mass serving as the sole means to loosen the ice block from said mold and to shift the whole block of ice outwardly for exposing substantially all surfaces of the ice block to cooled air in said compartment of said first chamber.

11. The method of making an ice block within a compartment enclosing a mold comprised of walls providing two chambers communicating with one another by a continuously open restricted passage and of ejecting the block of ice from the mold which consists in; filling the mold chambers and passage with a body of water common thereto, artificially and simultaneously cooling both chambers of the mold within said compartment, differentially freezing water in the chambers to form a solid block of ice in one chamber prior to solidifying that portion of the body of water in the other chamber, then expanding the freezing mass in said other chamber through said open restricted passage in the form of a stem of ice moving into said one chamber, and thereafter utilizing movement of said ice stem as the sole motive force to shift the whole ice block frozen in said one chamber outwardly to expose substantially all surfaces of the block of ice to cooled air within said compartment and ready the ice block for removal from the mold thereof.

12. The method of making an ice block within a compartment enclosing a mold comprised of walls providing two chambers communicating with one another by a continuously open restricted passage and of ejecting the block of ice from the mold into a storage receptacle adjacent thereto within the compartment which consists in; filling the mold chambers and passage with a body of water common thereto, artificially and simultaneously cooling both chambers of the mold within said compartment, differentially freezing water in the chambers to form a solid block of ice in one chamber prior to solidifying that portion of the body of water in the other chamber, then expanding the freezing mass in said other chamber through said open restricted passage in the form of a stem of ice moving into said one chamber, utilizing movement of said ice stem as the sole motive force to loosen the ice block in said one chamber from said mold and to shift the whole block of ice in said one chamber outwardly thereof beyond walls thereof, and fracturing the juncture between the ice block and the ice stem by the shifting of said block of ice to direct same into the storage receptacle.

13. In combination, a compartment enclosing a mold and an ice storage receptacle positioned adjacent thereto, said mold being comprised of walls providing a chamber, an open end cavity and a restricted passage connecting said chamber to said cavity, said chamber, said cavity and said passage being adapted to receive and retain a body of water common thereto, means for simultaneously cooling walls of the chamber and cavity of said mold within said compartment to solidify that portion of the body of water in said cavity into a solid block of ice therein prior to freezing the portion of the body of water in said chamber, said restricted passage constricting the freezing and expanding mass in said chamber to extrude a moving stem of ice therefrom through the passage into said cavity, the movement of said stem of ice serving as the sole means to shift the whole ice block formed in the cavity out of the open end of said cavity beyond walls thereof, and means within said compartment engageable by the shifting ice block to break it loose from said ice stem and direct the loosened block of ice away from the mold into said storage receptacle.

14. In combination, a compartment enclosing a mold and an ice storage receptacle positioned adjacent thereto, said mold being comprised of walls providing a chamber, an open end cavity and a restricted passage connecting said chamber to said cavity, said chamber, said cavity and said passage being adapted to receive and retain a body of water common thereto, means for simultaneously cooling walls of the chamber and cavity of said mold within said compartment, means for causing differential freezing of water contained in the cavity and the chamber to solidify that portion of the body of water in said cavity into a solid block of ice therein prior to freezing the portion of the body of water in said chamber, said restricted passage constricting the freezing and expanding mass in said chamber to extrude a moving stem of ice therefrom through the passage into said cavity, the movement of said stem of ice serving as the sole means to shift the whole ice block formed in said cavity out of the open end of said cavity beyond walls thereof, and means within said compartment engageable by the shifting ice block to break it loose from said ice stem and direct the loosened block of ice away from the mold into said storage receptacle.

15. In combination, a compartment enclosing a mold and an ice storage receptacle positioned adjacent thereto, said mold being comprised of walls providing a chamber, an open end cavity and a restricted passage connecting said chamber to said cavity, said chamber, said cavity and said passage being adapted to receive and retain a body of water common thereto, a refrigerant system associated with said compartment including a refrigerant evaporator for simultaneously cooling walls of the chamber and cavity of said mold within said compartment, means in said compartment insulating said mold from said evaporator for differentially freezing water in the chamber and cavity to solidify that portion of the body of water in said cavity into a solid block of ice therein prior to freezing the portion of the body of water in said chamber, said restricted passage constricting the freezing and expanding mass in said chamber to extrude a moving stem of ice therefrom through the passage into said cavity, the movement of said stem of ice serving as the sole means to shift the whole ice block formed in said cavity out of the open end of said cavity beyond walls thereof, and means within said compartment adjacent the open end of said cavity engageable by the shifting ice block to break it loose from said ice stem and direct the loosened block of ice away from the mold into said storage receptacle.

16. In combination, a refrigerator having a compartment therein, a refrigerating system including a refrigerant evaporator for chilling air in said compartment to a temperature below 32° F., an open top ice mold within said compartment comprised of walls adapted to receive a body of water, the water in said open top mold being in direct contact with the chilled air within said compartment, said mold being out of thermal conductive relationship with said evaporator and cooled solely by the cold air in said compartment, said cold air freezing a predetermined portion of the body of water in said mold into ice before freezing the remainder thereof, means associated with said mold and effective only after said predetermined portion of the body of water has been frozen therein for shifting said ice outwardly thereof to expose substantially all surfaces of the shifted ice to the cold air in said compartment before removal of said ice from the mold, and the cold air within said compartment then freezing said remainder of the body of water prior to ejecting said shifted ice to a point in said compartment beyond said mold walls.

17. In combination, a refrigerator having a compartment therein, a refrigerating system including a refrigerant evaporator for chilling air in said compartment to a temperature below 32° F., an open top ice mold within said compartment comprised of walls adapted to receive a body of water, the water in said open top mold being in direct contact with the chilled air within said compartment, said mold being out of thermal conductive relationship with said evaporator and cooled solely by the cold air in said compartment, a storage means in said refrigerator for receiving ice from said mold and storing same in the cold air within said compartment, said cold air freezing a predetermined portion of the body of water in said mold into ice before freezing the remainder thereof, means associated with said mold and effective only after said predetermined portion of the body of water has been frozen therein for shifting said ice outwardly thereof to expose substantially all surfaces of the shifted ice to the cold air in said compartment before removal of said ice from the mold, and the cold air within said compartment then freezing said remainder of the body of water prior to ejecting said shifted ice to a point beyond said mold walls into said storage means.

18. In combination, a compartment enclosing a mold, said mold having a first open top chamber in one portion thereof and a second chamber in another portion thereof, said chambers being adapted to receive and retain liquid therein, a refrigerating system including a refrigerant evaporator for chilling air in said compartment to a temperature below 32° F., the liquid in said open top chamber being in direct contact with the chilled air in said compartment, said mold being out of thermal conductive relationship with said evaporator and both of said portions of the mold being simultaneously cooled by the chilled air in said compartment, means for causing differential freezing of liquid in the chambers to form a solid block in said first open top chamber and to subsequently expand the freezing mass in said second chamber, and said subsequent expanding mass serving as the sole means to shift said block frozen in said first open top chamber outwardly thereof for exposing substantially all surfaces of the block to chilled air within said compartment before removing said block to a point beyond said mold.

References Cited in the file of this patent

UNITED STATES PATENTS

| | | |
|---|---|---|
| 921,370 | Degener | May 11, 1909 |
| 2,259,066 | Gaston | Oct. 14, 1941 |
| 2,763,996 | Lees | Sept. 25, 1956 |

FOREIGN PATENTS

| | | |
|---|---|---|
| 929,255 | Germany | June 23, 1955 |